May 29, 1928.
G. A. CARLSON
1,671,571
SASH REGULATING DEVICE
Filed Dec. 15, 1924   2 Sheets-Sheet 1
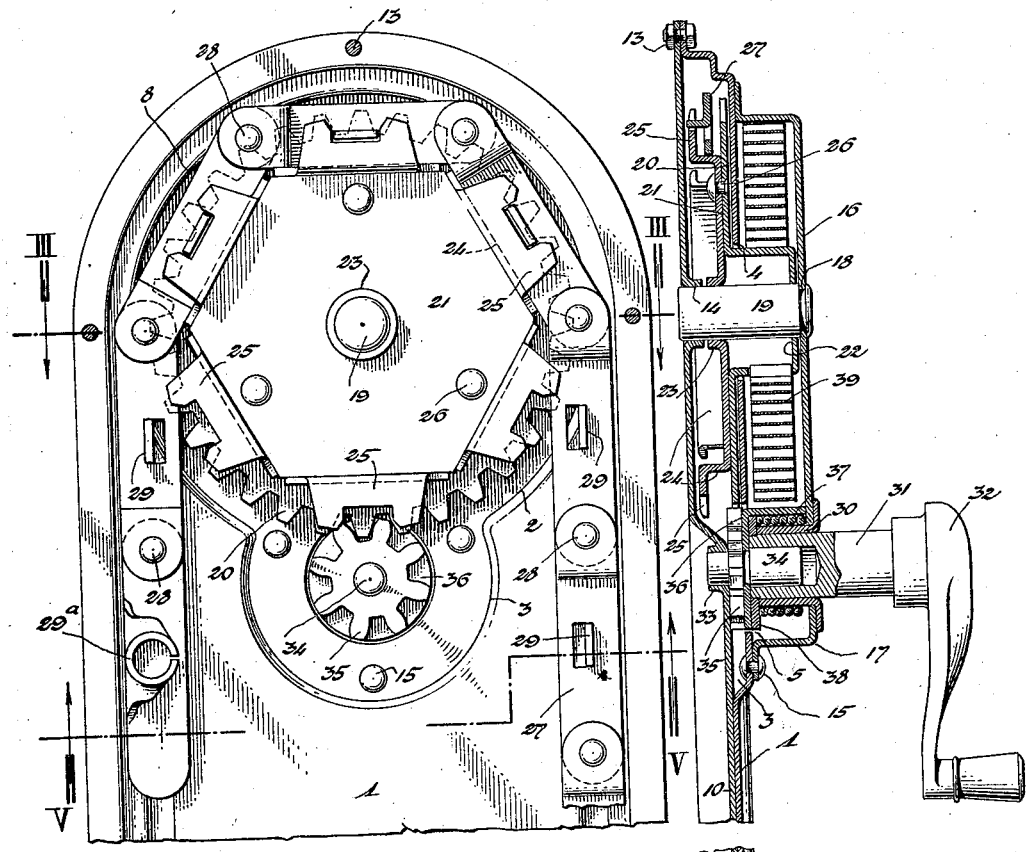
Inventor:
Gustave A. Carlson
By
Attorneys Patented May 29, 1928.

1,671,571

UNITED STATES PATENT OFFICE.

GUSTAVE A. CARLSON, OF DETROIT, MICHIGAN.

SASH-REGULATING DEVICE.

Application filed December 15, 1924. Serial No. 755,990.

This invention relates to a chain wheel drive that may be advantageously used in connection with a sash regulating device for automobiles, such a device including an arbor driven wheel over which is trained a sash supporting chain or flexible member.

My invention aims to provide a chain and wheel drive composed of parts cut and stamped from sheet metal, the chain including links adapted to bear upon the facets of a wheel, and interlock with portions of the wheel, and the wheel having its facets shaped so as to afford interlocking portions for the links of the chain. The wheel also includes a driven part shaped to form a drum, and these various chain and wheel parts, being made of stampings, can be manufactured at a comparatively small cost and easily assembled for operation in a comparatively small space, as required in connection with a sash regulating device.

My invention will be hereinafter specifically described and then claimed, and reference will now be had to the drawing wherein:

Figure 1 is a front elevation of a sash regulating device with a cover broken away, and including a chain and wheel drive in accordance with this invention;

Fig. 2 is a vertical sectional view of the same;

Fig. 3 is a horizontal sectional view taken on the line III—III of Fig. 1;

Figure 4:
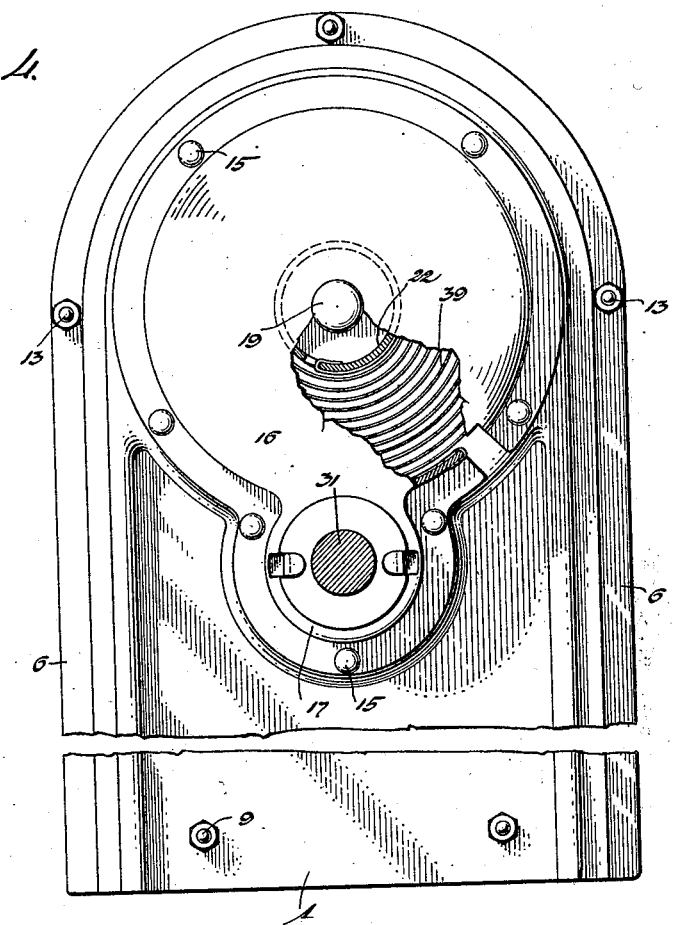
Fig. 4 is a front elevation of the sash regulating device, partly broken away and partly in section.

In the drawing the reference numeral 1 denotes an oblong casing which has its upper end braced to provide communicating recesses 2 and 3, each substantially circular and concentric of said recesses are openings 4 and 5. The casing 1 is formed with side flanges 6 and longitudinal grooves 7, said grooves being spaced apart, each adjacent and attached to the casing and the upper ends of the grooves connected by a semicircular groove 8.

Attached to the casing 1 by nut equipped screws 9 or other fastening means is a closure plate 10 which for the greater part of its length has offset side flanges 11 cooperating with the edges of the casing 1 in providing longitudinal chainways 12. The upper end of the closure plate is attached to the flanges 6 of the casing 1 by nut equipped screws 13 and said closure plate is formed with a flanged opening or bearing 14 having the same axis as the opening 4 in the recessed wall of the casing 1.

Attached to the recessed wall of the casing 1, by rivets 15 or other fastening means is a main cylindrical housing 16 having a branch housing 17 and the housing 16 has a concentric opening 18 alining with the bearing 14 so that the housing may cooperate with the bearing in supporting a fixed arbor 19 on which is rotatable a gear wheel 20 and a chain wheel 21. The gear wheel 20 is cut and stamped from sheet metal and is formed with a hollow pressed out hub portion 22 extending through the opening 4 of the casing 1 into the housing 16.

The chain wheel 21 is also cut and pressed from sheet metal and is formed with a hub portion 23 engaging the fixed arbor 19. The chain wheel is hexagonal in elevation or some shape that will afford a multiplicity of facets, the outer edge of said wheel being pressed to provide a plurality of shoulders 24 having notched outstanding walls 25 which cooperate with the gear wheel 20 in forming troughs about the chain wheel. The trough formation is maintained by connecting the gear wheel to the chain wheel by rivets 26 or other fastening means and these two wheels are adapted to revolve about the arbor 19 or may be fixed to said arbor if the arbor is journaled in the bearing 14 and the housing 16.

Figure 5:
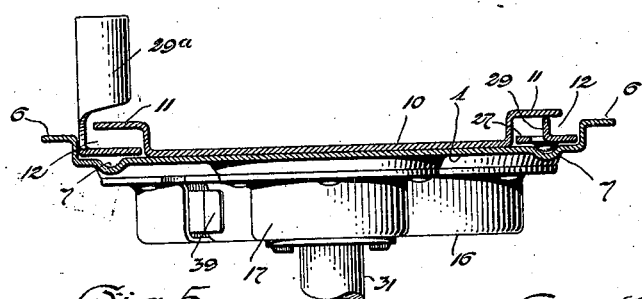
Fig. 5 is a horizontal sectional view taken on the line V—V of Fig. 1.

Trained over the chain wheel 21 and resting on the shoulders 24 thereof is a chain composed of links 27 cut and stamped from sheet metal. Each link has its ends apertured with one end offset so that the links may be placed end to end and pivotally connected together by rivets 28 or other pivotal means. Straight edges of the links approximate in length the shoulders 24 of the chain wheel and each link, intermediate its ends, is outstruck to provide a longitudinally disposed tooth 29 adapted to engage in a notched flange 25 of the chain wheel and establish a driving relation between the wheel and chain. The links in passing over the chain wheel rest on the shoulders 24 in substantially an upright position on said shoulders and parallel to the flanges 25, so that the teeth will extend into the notches of said flanges, as best shown in Figs. 1 and 2. The links in passing up and down the casing 1 are guided in the ways 12 by the heads of the rivets 28 extending into the grooves 7, and by reference to Fig. 5 it will be noted that the closure plate 10 will cooperate with the casing 1 in preventing displacement of the ends of the chain during movement of the chain by the chain wheel. One of the links is provided with a lateral extension 29$^a$ so that it may be operatively connected to a sash adapted to be raised and lowered by the chain.

Mounted in the branch housing 17 is a bushing 30 and journaled in said bushing is a shaft 31 having a crank 32. The shaft 31 cooperates with a bearing 33 of the closure plate 10 in supporting an arbor 34 on which is mounted a small gear wheel 35 that meshes with a large gear wheel 20. Mounted on the arbor is a follower 36, and surrounding the bushing 30 is a clutch or brake member 37 in the form of a coiled spring engaging a member 38 which cooperates with the follower in providing an automatic clutch device for preventing accidental rotation of the arbor 34, particularly by any weight sustained by the chain trained over the chain wheel 21. Various kinds of clutching devices may be installed in the branch housing 17 to prevent an irreversible action of the chain wheel drive mechanism after the sash has been adjusted to a desired position, and to facilitate raising the sash a coiled band spring 39 is located in the main housing 16 with its inner convolution attached to the hollow hub 22 of the gear wheel 20 and its outer convolution attached to the housing 16, as best shown in Fig. 4.

It is thought that the operation and utility of my sash regulating device will be apparent without further description, and I desire to direct attention to the fact that the greater part of the device is composed of sheet metal stampings that may be compactly arranged to afford a light and durable structure, such as may be easily and quickly installed in the sash well of an automobile door or body wall, without any danger of the device rattling or becoming accidentally displaced. A few turns of the crank 32 are only necessary for raising or lowering the sash from one extreme position to the other extreme, and while in the drawings there is illustrated a preferred embodiment of my invention for accomplishing this result, it is to be understood that the structural elements are susceptible to such variations and modifications as fall within the scope of the appended claims.

What I claim is:—

1. In a chain and gear mechanism wherein rotation of an arbor imparts movement to a chain—a casing having a chain guideway therein, a chain composed of flat links slidable in the guideway of said casing, said chain links having pressed out teeth intermediate the ends thereof, a chain wheel rotatable in said casing and formed with notched flanges for the teeth of the chain links, the formation of the notched flanges of said chain wheel affording shoulders on which bear the edges of the chain links, and a gear wheel attached to said chain wheel and adapted to be driven by said arbor.

2. A chain and gear mechanism as called for in claim 1, wherein said gear wheel cooperates with said chain wheel in forming troughs for the chain links.

3. In a chain and gear mechanism wherein rotation of an arbor imparts movement to a chain; a chain composed of flat links, said links having pressed out teeth intermediate the ends thereof, and a rotatably mounted chain wheel formed with notched flanges for receiving the teeth of said links.

In testimony whereof I affix my signature.

GUSTAVE A. CARLSON.